United States Patent
Bertola et al.

(10) Patent No.: US 11,731,456 B2
(45) Date of Patent: Aug. 22, 2023

(54) WHEEL HUB BEARING WITH RADIAL STIFFENING

(71) Applicant: Aktiebolaget SKF, Gothenburg (SE)

(72) Inventors: Maurizio Bertola, Turin (IT); Fausto Morello, Sommariva del Bosco (IT); Abhijeet Somwanshi, Pune (IN)

(73) Assignee: Aktiebolaget SKF, Gothenburg (SE)

( * ) Notice: Subject to any disclaimer, the term of this patent is extended or adjusted under 35 U.S.C. 154(b) by 539 days.

(21) Appl. No.: 16/775,606

(22) Filed: Jan. 29, 2020

(65) Prior Publication Data

US 2020/0369082 A1 Nov. 26, 2020

(30) Foreign Application Priority Data

May 24, 2019 (IN) .............................. 201941020726

(51) Int. Cl.
*F16C 19/18* (2006.01)
*B60B 27/00* (2006.01)

(52) U.S. Cl.
CPC ...... *B60B 27/0094* (2013.01); *B60B 27/0005* (2013.01); *B60B 27/0078* (2013.01); *F16C 19/186* (2013.01); *B60B 2380/12* (2013.01); *F16C 2326/02* (2013.01)

(58) Field of Classification Search
CPC .... F16C 19/186; F16C 33/58; F16C 2326/02; B60B 27/0005; B60B 27/001; B60B 27/0078; B60B 27/0094; B60B 2380/12
See application file for complete search history.

(56) References Cited

U.S. PATENT DOCUMENTS

| 10,752,049 B2 * | 8/2020 | Nakatsuji ............... F16C 35/067 |
| 2012/0189236 A1 * | 7/2012 | Yokota ................ B60B 27/0005 384/589 |

FOREIGN PATENT DOCUMENTS

| DE | 202016105899 U1 | 1/2017 | |
| DE | 202016105889 U1 | 1/2018 | |
| JP | 2006137365 A * | 6/2006 | ............ F16C 19/186 |
| JP | 2007269066 A * | 10/2007 | ......... B60B 27/0005 |
| JP | 2018071644 A * | 5/2018 | ......... B60B 27/0052 |
| KR | 2018136298 A * | 12/2018 | ......... B60B 27/0005 |
| WO | WO-2019149299 A1 * | 8/2019 | |

OTHER PUBLICATIONS

Machine Translation of JP-2006137365-A (Year: 2006).*
Machine Translation of JP-2007269066-A (Year: 2007).*
Machine Translation of KR-2018136298-A (Year: 2018).*
Machine Translation of WO-2019149299-A1 (Year: 2019).*
Machine Translation of JP-2018071644-A (Year: 2018).*

* cited by examiner

*Primary Examiner* — Alan B Waits
(74) *Attorney, Agent, or Firm* — Garcia-Zamor Intellectual Property Law, LLC; Ruy Garcia-Zamor

(57) ABSTRACT

A wheel hub bearing for motor vehicles providing a hub and a bearing unit in turn comprising a radially outer ring, at least one radially inner ring, at least one crown of rolling bodies between the radially outer ring and the radially inner ring. The hub has a radial stiffening. The radial stiffening of the hub has a misalignment respect to a seat. Accordingly, a distance between a centerline axis of the seat of the radially inner ring on the hub and a center line of the radial stiffening, less than or equal to 25% of a length of the seat.

5 Claims, 2 Drawing Sheets

WHEEL HUB BEARING WITH RADIAL STIFFENING

CROSS-REFERENCE TO RELATED APPLICATIONS

This application claims priority to Indian Patent Application no. IN201941020726, filed May 24, 2019, the contents of which are fully incorporated herein by reference.

TECHNICAL FIELD OF THE INVENTION

The present invention relates to a wheel hub bearing provided with a flanged hub having a radial stiffening. In particular, the present invention relates to an improved wheel hub bearing provided with a pair of rolling bearings for rotatably supporting a vehicle wheel on a suspension.

Such applications include both the case where the outer ring of the bearings is rotatable while the inner rings of the bearing are fixed, and the opposite case in which the inner rings rotate and the outer ring is fixed. The invention is also suitable for any type of rolling bodies (balls, rollers, tapered rollers, etc.). The invention is applicable to the non-driving wheels of the motor vehicle.

BACKGROUND OF THE INVENTION

Wheel hub bearing provided with a bearing unit for rotatably supporting a vehicle wheel on a suspension are known and commonly used. The bearing unit typically includes a pair of rolling bearings.

According to the prior art, the wheel hub bearing comprises a rotatable hub provided with a joint for hooking a rotating element of the motor vehicle, for example the wheel or the disk of a braking element, while the bearing unit comprises an outer ring, a pair of inner rings, one of which may be the hub itself, and a plurality of rolling bodies, e.g. balls, rollers or tapered rollers. All these components have an axial symmetry with respect to the rotation axis of the rotating elements, for example the hub and the inner rings of the bearing unit.

Typically, the hub is realized so that its weight is as small as possible and therefore has an internal lightening cavity. This cavity can not pass through the axisymmetry direction: such an embodiment would present an insufficient structural resistance to the loads acting on the bearing unit and to the consequent deformations.

This drawback is obviated by providing the hub with a radial stiffening which in practice divides the axial cavity into two portions, one axially external, or towards the wheel or the brake disc and an axially internal, opposite to the first, towards the suspension of the motor vehicle. A solution according to this known technique is described in the patent application DE 20 2016 105 889 U1. According to this solution, the radial stiffening provided therein is allocated in a symmetrical position with respect to the pair of inner rings of the bearing unit and has a considerable thickness which, on the one hand, makes the structure sufficiently rigid, on the other hand, it gives the entire wheel hub bearing an equally remarkable weight that penalizes performances and consumption of the vehicle.

There is therefore a need to design a wheel hub bearing whose hub is provided with a radial stiffening which does not penalize the performance of the whole group and, consequently, of the motor vehicle.

SUMMARY OF THE INVENTION

An aim of the present invention is to provide a wheel hub bearing for motor vehicles provided with a flanged hub, in turn equipped with a thin thickness radial stiffening, and a bearing unit comprising an outer ring, a pair of inner rings, of which the inner axially outer ring consists of the same hub while the inner axially inner ring is a separate element mounted on the hub, and a plurality of rolling bodies, for example balls. The flanged, rotatable hub is connected to a non-motive wheel of a motor vehicle. The radial stiffening of the hub acts as a vertical column that separates the wheel side and the axle supports. This column strengthens and supports loads that act on the bearing during operating conditions. The invention achieves its objective which is to obtain the minimum thickness of the wall of the hub cavity in the axially external direction, or towards the wheel, through the molding operation, without compromising the performance requirements required by the vehicle manufacturer. In other words, according to the invention, it is possible to obtain a light-weight wheel hub bearing which at the same time allows the bearing unit to achieve the desired performance as regards the fatigue life.

The advantage according to the invention is that of introducing the least possible material by designing a flanged hub which is lighter, but capable of supporting the radially inner ring mounted thereon thanks to a section provided with sufficient material and located precisely at such an inner ring.

The achievement of these objectives is achieved, according to a first aspect of the invention, by positioning the radial stiffening at the center line of the radially inner ring seat mounted on the hub. The misalignment with respect to the center line must be within the limits of ±25% of the length of the seat of the radially inner ring on the hub. In this way a remarkable increase in the number of fatigue life cycles obtainable from the wheel hub bearing has been obtained.

According to another aspect, the thickness of the radial stiffening obtained by making the hub cavity on the axially internal side for forging or for chip removal, can vary from 2.5 to 5.5 mm, depending on the intended application.

According to a further aspect, the internal profile of the cavity of the axially internal hub, or that corresponding to the seat of the radially inner ring, can be made with a particular profile comprising a first radius of curvature, a linear portion according to an oblique direction and a second radius of curvature. In this way it is possible to further improve the fatigue life of the group while introducing the least possible material. In practice, by proceeding it is possible to create a structural strengthening, a sort of triangular section, in correspondence of the radially inner ring-hub interface, which very well supports the loads transmitted through the bearing unit.

Therefore, according to the present invention a wheel hub bearing is provided, provided with a flange hub with a thin radial stiffening having the characteristics set forth in the independent claim, annexed to the present description.

Further embodiments of the invention, preferred and/or particularly advantageous, are described according to the characteristics set forth in the attached dependent claims.

BRIEF DESCRIPTION OF THE DRAWINGS

The invention will now be described with reference to the accompanying drawings, which illustrate some non-limiting embodiments thereof, in which.

DETAILED DESCRIPTION OF THE INVENTION

By way of non-limiting example, the present invention will now be described with reference to a wheel hub bearing for motor vehicles provided with a rolling bearing.

Figure 1:
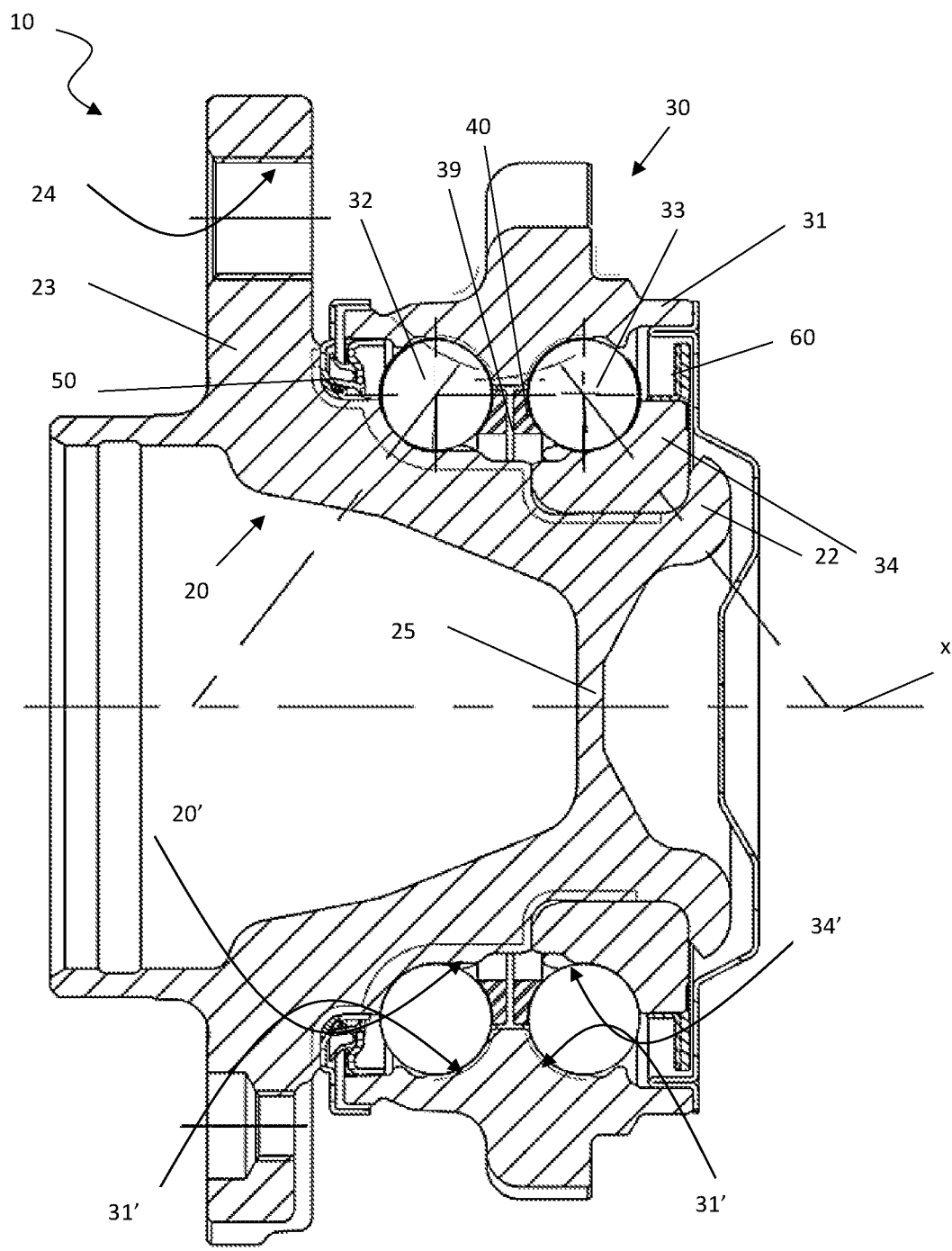
FIG. 1 is a cross-section of a wheel hub bearing provided with a flanged hub with a thin radial stiffening, according to an embodiment of the present invention.
Figure 2:
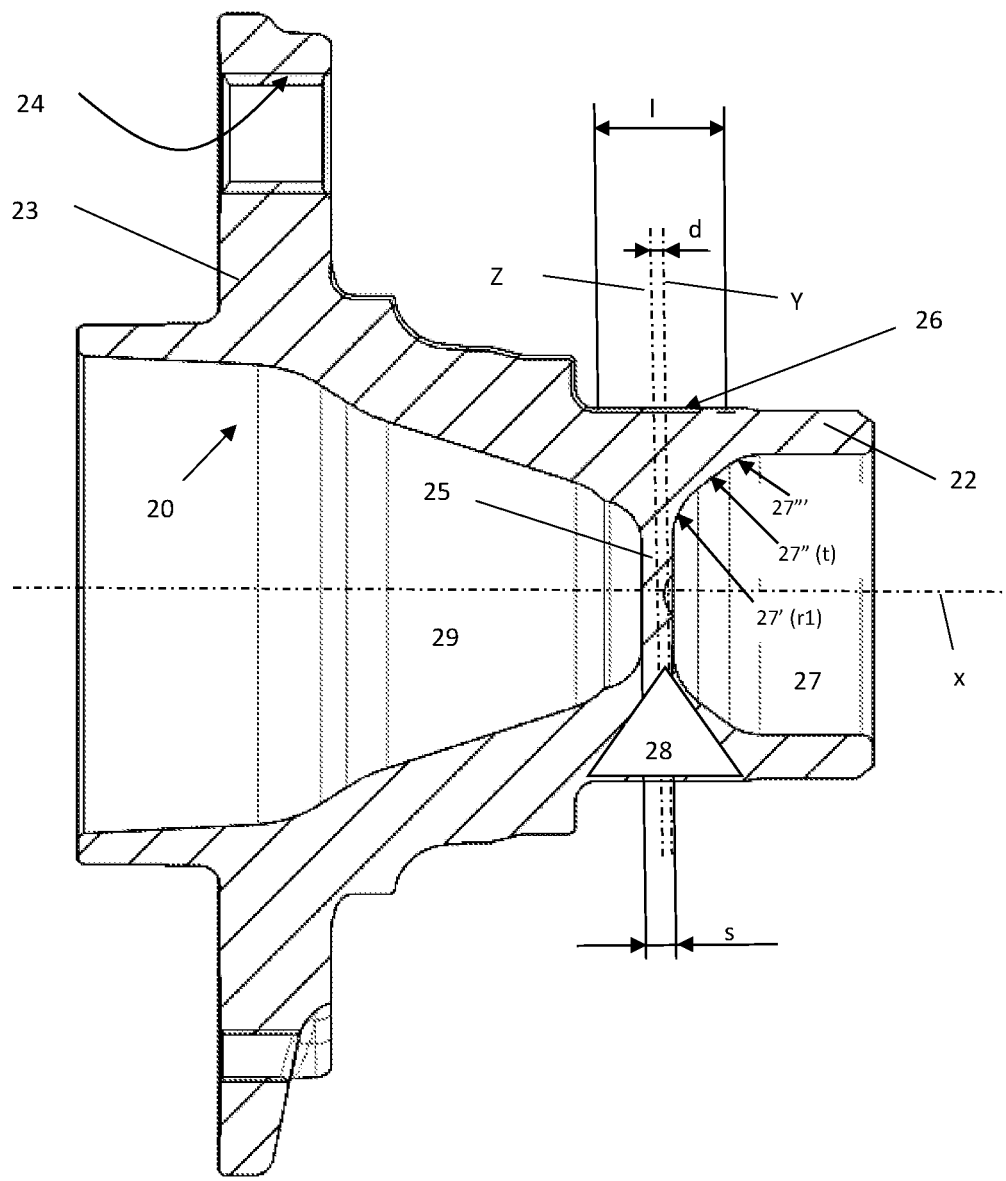
FIG. 2 is a section of the flanged hub of FIG. 1.

With reference to FIGS. 1 and 2, a wheel hub bearing according to a preferred embodiment of the invention is indicated as a whole with 10. The figure shows a detail of the exemplifying configuration.

The wheel hub bearing 10 has a central rotation axis X and comprises a hub 20 preferably, but not necessarily, rotatable, and a bearing unit 30 which in turn comprises:

a radially outer ring 31, preferably, but not necessarily, stationary, a radially inner ring 20 defined by the hub 20, a further radially internal ring 34 rotatable mounted on and integral with the hub 20;

two rows of rolling bodies 32, 33, in this example balls, interposed between the radially outer ring 31 and the radially inner rings 20 and 34; and two cages 39 and 40 for keeping in position the rolling bodies of the rolling bodies rows 32, 33.

Throughout the present description and the claims, the terms and expressions indicating positions and orientations such as "radial" and "axial" refer to the central rotation axis X of the bearing unit 30. Expressions such as "axially external" and "axially internal" are, instead, referred to the mounted condition of the wheel hub bearing, and in this case, preferably, they refer to a wheel side and, respectively, to a side opposite the wheel side.

The radially outer ring 31 is provided with two respective radially outer raceways 31', while the radially inner rings 20, 34 are provided with respective radially inner raceways 20', 34' to allow the rotation of the rolling bodies row 32, axially outer, interposed between the radially outer ring 31 and the hub 20, and the rolling bodies row 33, axially inner, between the radially outer ring 31 and the radially inner ring 34. For simplicity of graphical representation the references 32, 33 will be attributed both to the individual balls and to the ball rows. Again for simplicity, the term "ball" can be used in an exemplary manner in the present description and in the accompanying drawings in place of the more generic term "rolling body" (and the same numerical references will also be used).

The hub 20 defines in its axially inner end a rolled edge 22 which is configured for axially preloading the inner ring 34. The hub 20 also has an axially outer flange portion 23. The flange portion has a plurality of axial fixing holes 24. These holes are the seats for the same number of fixing means (for example stud bolts, not shown in the figure) which connect in a known manner an element of the motor vehicle wheel, for example the non-driven wheel or the brake disc (also of the known type and not shown in the figure), to the hub 20. The hub 20 is provided with a thin radial stiffening 25, whose characteristics which represent the core of the invention will be better described hereafter.

The wheel hub bearing 10 can also be provided with sealing means 50 for sealing the bearing unit from the external environment. Moreover, the wheel hub bearing may also be provided with devices for detecting a parameter of the motor vehicle, for example the speed of rotation of the rotating ring 34 of the bearing unit 30, for example an encoder 60, as shown in FIG. 1.

With reference also to FIG. 2, the characteristics of the flanged hub with radial stiffening 25 of thin thickness according to the present invention are illustrated. The radial stiffening 25, as shown in FIG. 2, is interposed between a first axially outer cavity 29 of the hub 20 and a second axially internal cavity 27 of the same hub 20. Advantageously both the cavities can be made for forging or for chip removal.

As the, the radial stiffening 25 of the hub acts as a vertical column which reinforces and supports the loads acting on the bearing during operating conditions. The advantage according to the invention is that of introducing the least possible material by designing a hub 20 that is lighter, but capable of supporting the radially inner ring 34 mounted on it thanks to a section provided with sufficient material and allocated precisely in correspondence of this inner ring.

In fact, the radial stiffening 25 of the hub 20 is positioned in correspondence of the seat 26 of the radially inner ring 34 on the hub 20, the seat being defined by its length "l". Advantageously, the radial stiffening 25 may be positioned precisely at the center line, defined by the Y axis, of the seat 26 of the radially inner ring 34 mounted on the hub 20. In any case, the misalignment of the radial stiffening 25 with respect to the seat 26 of the radially inner ring 34 on the hub 20 (misalignment "d" defined as the distance between the centerline Y axis of the seat 26 of the radially inner ring 34 and the centerline Z axis of the radial stiffening 25) must be contained within the limits of ±25% of the length "l" of the seat 26 of the ring radially internal 34 on the hub 20. In this way, both the analytical predictions carried out by means of CAE instruments, and the experimental evidences have shown that this solution allows a remarkable increase in the number of fatigue life cycles obtainable from the wheel hub bearing.

Advantageously, the axial thickness "s" of the radial stiffening 25, obtained by making, as the, the cavity 27 of the hub 20 on the axially internal side for forging or for chip removal, can vary from 2.5 to 5.5. mm, depending on the intended application. The minimum value of the axial thickness "s" is limited by technological constraints. In any case, the maximum value of the "s" thickness is however significantly lower than the current solutions, where the values of the radial stiffening thickness exceed 6.5 mm A good compromise is obtained by setting the value of the axial thickness "s" of the radial stiffening 25 equal to 3 mm, having already demonstrated the technological feasibility and the achievement of the desired performance.

Preferably, the internal profile of the axially internal cavity 27 of the hub 20, in correspondence with the seat 26 of the radially inner ring 34, instead of being produced according to the prior art by means of a single bending radius, may be produced in such a way as to comprise: a first portion 27' defined by a first radius of curvature "r1"; a second portion 27" defined by a linear section "t" according to an oblique direction; a third portion 27'" defined by a second radius of curvature "r2". In this way it is possible to further improve the fatigue life of the group while introducing the least possible material. In practice, in this way it is possible to create a structural strengthening, a sort of triangular section 28, in correspondence of the interface hub 20—radially inner ring 34, which well supports the loads transmitted through the bearing unit 30.

In addition to the embodiment of the invention, as described above, it is to be understood that numerous further variants exist. It must also be understood that such embodiments are only exemplary and limit neither the scope of the invention, nor its applications, nor its possible configurations. On the contrary, although the above description makes it possible for the skilled technician to implement the present invention at least according to an exemplary embodiment thereof, it must be understood that many variations of the described components are conceivable, without thereby departing from the scope of the invention, as defined in the attached claims, which are interpreted literally and/or according to their legal equivalents.

The invention claimed is:

1. A wheel hub bearing for motor vehicles, comprising:
a hub and a bearing unit in turn comprising:
   a radially outer ring comprising an outer raceway,
   at least one radially inner ring comprising an inner raceway forming a rolling body contacting portion and a curved section extending from the rolling body contacting portion,
   at least one row of rolling bodies between the radially outer ring and the radially inner ring, the hub having a radial stiffening, wherein
   the radial stiffening of the hub presents a misalignment with respect to a seat, the misalignment being a distance between a center line axis of the seat of the radially inner ring on the hub and a center line axis of the radial stiffening being less than or equal to 25% of a length of the seat, wherein
   the radial stiffening further defines a central portion straddling the center line axis, the central portion axially overlapping, but not extending axially past, the at least one row of rolling bodies, and wherein the curved section of the inner raceway extends radially away from the at least one row of rolling bodies such that that the rolling body contacting portion of the inner raceway does not extend axially past the at least one row of rolling bodies.

2. The wheel hub bearing according to claim 1, wherein the radial stiffening is positioned exactly at the center line, defined by the axis, of the seat of the radially inner ring mounted on the hub.

3. The wheel hub bearing according to claim 1, wherein the radial stiffening has an axial thickness between 2.5 and 5.5 mm.

4. The wheel hub bearing according to claim 3, wherein the value of the axial thickness of the radial stiffening is equal to 3 mm.

5. The wheel hub bearing according to claim 1, wherein an internal profile of an axially internal cavity of the hub comprises:
   a first portion defined by a first radius of curvature;
   a second portion defined by a linear section according to an oblique direction; and
   a third portion defined by a second radius of curvature.

* * * * *